United States Patent
Ngo

(10) Patent No.: US 10,379,957 B2
(45) Date of Patent: *Aug. 13, 2019

(54) SYSTEMS AND METHODS FOR ANALYZING SNAPSHOTS

(71) Applicant: Commvault Systems, Inc., Tinton Falls, NJ (US)

(72) Inventor: David Ngo, Shrewsbury, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 702 days.

This patent is subject to a terminal disclaimer.

(21) Appl. No.: 15/069,228

(22) Filed: Mar. 14, 2016

(65) Prior Publication Data

US 2016/0246680 A1 Aug. 25, 2016

Related U.S. Application Data

(63) Continuation of application No. 13/874,323, filed on Apr. 30, 2013, now Pat. No. 9,298,559, which is a (Continued)

(51) Int. Cl.
  *G06F 17/30* (2006.01)
  *G06F 11/14* (2006.01)
  *G06F 16/2458* (2019.01)

(52) U.S. Cl.
  CPC ...... *G06F 11/1446* (2013.01); *G06F 11/1448* (2013.01); *G06F 11/1471* (2013.01);
  (Continued)

(58) Field of Classification Search
  CPC ............. G06F 11/1446; G06F 11/1448; G06F 11/1471; G06F 17/30551
  See application file for complete search history.

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

U.S. Appl. No. 14/684,188, filed Apr. 10, 2015, Bansod et al.

(Continued)

*Primary Examiner* — Jeff A Burke
(74) *Attorney, Agent, or Firm* — Perkins Coie LLP

(57) ABSTRACT

This application describes techniques for creating a second snapshot of a first snapshot of a set of data, modifying the first snapshot, and reverting the modifications to the first snapshot. For example, portions of one or more transaction logs may be played into a database to put the database in a particular state a particular point in time. The second snapshot may then be used to revert to a prior state of the database such that additional transaction logs may be played into the database. These techniques enable the ability to put the database into multiple states as the database existed at multiple points in time. Therefore, data can be recovered from the database as the data existed at different points in time. Moreover, individual data objects in the database can be accessed and analyzed as the individual data objects existed at different points in time.

21 Claims, 9 Drawing Sheets

Related U.S. Application Data continuation of application No. 12/978,984, filed on Dec. 27, 2010, now Pat. No. 8,433,682.

(60) Provisional application No. 61/291,805, filed on Dec. 31, 2009.

(52) U.S. Cl.
CPC ...... *G06F 16/2477* (2019.01); *G06F 11/1461* (2013.01); *G06F 2201/80* (2013.01); *G06F 2201/84* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,101,585 A | 8/2000 | Brown et al. |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,366,986 B1 | 4/2002 | St Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,959,310 B2 * | 10/2005 | Eshel ............... G06F 17/30067 |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,231,544 B2 | 6/2007 | Tan et al. |
| 7,234,115 B1 | 6/2007 | Sprauve et al. |

(56) References Cited

U.S. PATENT DOCUMENTS

| | | | |
|---|---|---|---|
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |
| 7,346,623 B2 | 3/2008 | Prahlad et al. |
| 7,383,538 B2 | 6/2008 | Bates et al. |
| 7,386,532 B2 | 6/2008 | Kiessig et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,426,052 B2 | 9/2008 | Cox et al. |
| 7,454,443 B2 | 11/2008 | Ram et al. |
| 7,480,779 B2 | 1/2009 | Tsuji |
| 7,509,316 B2 | 3/2009 | Greenblatt et al. |
| 7,523,278 B2 | 4/2009 | Thompson et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,565,572 B2 | 7/2009 | Yamasaki |
| 7,567,991 B2* | 7/2009 | Armangau | G06F 11/1435 |
| 7,568,080 B2 | 7/2009 | Prahlad et al. |
| 7,580,950 B2 | 8/2009 | Kavuri et al. |
| 7,587,563 B1 | 9/2009 | Teterin et al. |
| 7,596,611 B1 | 9/2009 | Satish et al. |
| 7,600,219 B2 | 10/2009 | Tsantilis |
| 7,620,666 B1 | 11/2009 | Root et al. |
| 7,651,593 B2 | 1/2010 | Prahlad et al. |
| 7,668,884 B2 | 2/2010 | Prahlad et al. |
| 7,707,184 B1 | 4/2010 | Zhang et al. |
| 7,716,171 B2 | 5/2010 | Kryger |
| 7,716,183 B2 | 5/2010 | Lee |
| 7,725,440 B2 | 5/2010 | Reed et al. |
| 7,734,578 B2 | 6/2010 | Prahlad et al. |
| 7,761,456 B1 | 7/2010 | Cram et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,873,806 B2 | 1/2011 | Prahlad et al. |
| 7,882,077 B2 | 2/2011 | Gokhale et al. |
| 7,933,927 B2 | 4/2011 | Dee et al. |
| 7,979,389 B2 | 7/2011 | Prahlad et al. |
| 8,055,625 B2 | 11/2011 | Prahlad et al. |
| 8,095,511 B2* | 1/2012 | Zwilling | G06F 11/1451 |
| | | | 707/649 |
| 8,117,410 B2 | 2/2012 | Lu et al. |
| 8,140,786 B2 | 3/2012 | Bunte et al. |
| 8,140,794 B2 | 3/2012 | Prahlad et al. |
| 8,161,077 B2 | 4/2012 | Zha et al. |
| 8,170,995 B2 | 5/2012 | Prahlad et al. |
| 8,195,623 B2 | 6/2012 | Prahlad et al. |
| 8,219,524 B2 | 7/2012 | Gokhale |
| 8,250,033 B1* | 8/2012 | De Souter | G06F 17/30088 |
| | | | 707/637 |
| 8,285,671 B2 | 10/2012 | Prahlad et al. |
| 8,307,177 B2 | 11/2012 | Prahlad et al. |
| 8,401,996 B2 | 3/2013 | Muller et al. |
| 8,433,682 B2 | 4/2013 | Ngo |
| 8,433,872 B2 | 4/2013 | Prahlad et al. |
| 8,442,944 B2 | 5/2013 | Prahlad et al. |
| 8,468,518 B2 | 6/2013 | Wipfel |
| 8,489,830 B2 | 7/2013 | Wu et al. |
| 8,543,998 B2 | 9/2013 | Barringer |
| 8,544,016 B2 | 9/2013 | Friedman et al. |
| 8,578,120 B2 | 11/2013 | Attarde et al. |
| 8,583,594 B2 | 11/2013 | Prahlad et al. |
| 8,595,191 B2 | 11/2013 | Prahlad et al. |
| 8,655,846 B2 | 2/2014 | Prahlad et al. |
| 8,719,767 B2 | 5/2014 | Bansod |
| 8,726,242 B2 | 5/2014 | Ngo |
| 8,805,953 B2 | 8/2014 | Murphy et al. |
| 8,898,411 B2 | 11/2014 | Prahlad et al. |
| 8,959,299 B2 | 2/2015 | Ngo et al. |
| 9,092,500 B2 | 7/2015 | Varadharajan et al. |
| 9,268,602 B2 | 2/2016 | Prahlad et al. |
| 2002/0107877 A1 | 8/2002 | Whiting et al. |
| 2003/0018657 A1 | 1/2003 | Monday |
| 2003/0028514 A1 | 2/2003 | Lord et al. |
| 2003/0028736 A1 | 2/2003 | Berkowitz et al. |
| 2003/0033346 A1 | 2/2003 | Carlson et al. |
| 2003/0140050 A1 | 7/2003 | Kaczmarski et al. |
| 2003/0158861 A1* | 8/2003 | Sawdon | G06F 11/1435 |
| 2003/0167380 A1 | 9/2003 | Green et al. |
| 2003/0177149 A1 | 9/2003 | Coombs |
| 2004/0139125 A1 | 7/2004 | Strassburg et al. |
| 2004/0170374 A1 | 9/2004 | Bender et al. |
| 2004/0230566 A1 | 11/2004 | Balijepalli et al. |
| 2004/0250033 A1 | 12/2004 | Prahlad et al. |
| 2004/0260678 A1 | 12/2004 | Verbowski et al. |
| 2005/0203864 A1 | 9/2005 | Schmidt et al. |
| 2005/0216788 A1 | 9/2005 | Mani-Meitav et al. |
| 2006/0190460 A1* | 8/2006 | Chandrasekaran | |
| | | | G06F 11/1474 |
| 2006/0224846 A1 | 10/2006 | Amarendran et al. |
| 2007/0043790 A1* | 2/2007 | Kryger | G06F 17/30613 |
| 2007/0185938 A1 | 8/2007 | Prahlad et al. |
| 2007/0185940 A1 | 8/2007 | Prahlad et al. |
| 2008/0183775 A1 | 7/2008 | Prahlad et al. |
| 2008/0228771 A1 | 9/2008 | Prahlad et al. |
| 2009/0260007 A1 | 10/2009 | Beaty et al. |
| 2009/0276771 A1 | 11/2009 | Nickolov et al. |
| 2009/0319534 A1 | 12/2009 | Gokhale |
| 2010/0070474 A1 | 3/2010 | Lad |
| 2010/0076934 A1 | 3/2010 | Pershin et al. |
| 2010/0077165 A1 | 3/2010 | Lu et al. |
| 2010/0082672 A1 | 4/2010 | Kottomtharayil et al. |
| 2010/0250824 A1 | 9/2010 | Belay |
| 2010/0293144 A1 | 11/2010 | Bonnet |
| 2010/0293146 A1 | 11/2010 | Bonnet et al. |
| 2010/0312754 A1 | 12/2010 | Bear et al. |
| 2010/0313185 A1 | 12/2010 | Gupta et al. |
| 2013/0246360 A1 | 9/2013 | Ngo |
| 2014/0114922 A1 | 4/2014 | Prahlad et al. |
| 2015/0169413 A1 | 6/2015 | Ngo et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0838758 | 4/1998 |
| EP | 0899662 A1 | 3/1999 |
| EP | 0981090 A1 | 2/2000 |
| EP | 1349088 | 10/2003 |
| EP | 1380947 | 1/2004 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000347811 | 12/2000 |
| WO | WO-9303549 | 2/1993 |
| WO | WO-9513580 A1 | 5/1995 |
| WO | WO-9912098 A1 | 3/1999 |
| WO | WO-2001004755 A1 | 1/2001 |
| WO | WO-02-088943 | 11/2002 |
| WO | WO-03028183 | 4/2003 |
| WO | WO-2003046768 A1 | 6/2003 |
| WO | WO-2004034197 | 4/2004 |
| WO | WO-2007021997 A2 | 2/2007 |
| WO | WO-2008080143 | 7/2008 |

OTHER PUBLICATIONS

U.S. Appl. No. 15/018,151, filed Feb. 8, 2016, Prahlad et al.
"Software Builds and the Virtual Machine," Dr. Dobb's, Jan. 23, 2008, 2 pages.
Armstead et al., "Implementation of a Campwide Distributed Mass Storage Service: The Dream vs. Reality," IEEE, Sep. 11-14, 1995, pp. 190-199.

(56) References Cited

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
CNET Reviews, "IPStor Enterprise Edition ZeroImpact Backup Enabler Option—(V.4.0) Manufacturer Description", May 8, 2004, 1 page.
CommVault Partner Advantage, "CommVault First to Market with Complete 'Zero Impact' Backup Solutions for Mixed Windows and UNIX Environments", <http://partners.commvault.com/microsoft/microsoft_news_story.asp?id=164>, Sep. 25, 2002, 2 pages.
CommVault Systems, Inc., "CommVault Galaxy Express 7.0 Backup & Recovery," copyright date 1999-2007, 4 pages.
CommVault Systems, Inc., "CommVault QiNetix: Architecture Overview," CommVault Systems White Paper, 2005, 35 pages.
CommVault Systems, Inc., "CommVault Simpana Software with SnapBackup," copyright date 1999-2009, 6 pages.
Commvault, "Remote Backup," <http://documentation.commvault.com/commvault/release_8_0_0/books_online_1/english_us/features/ddr/ddr.htm>, internet accessed on Dec. 17, 2009, 8 pages.
CommVault, "Snap Backup," <http://documentation.commvault.com/commvault/release_8_0_0/books_online_1/english_us/features/snap_backup/snap_backup.htm>, internet accessed on Dec. 17, 2009, 7 pages.
CommVault, "Snapshots," <http://documentation.commvault.com/commvault/release_8_0_0/books_online_1/english_us/features/snapshots/snapshots.htm>, internet accessed on Dec. 15, 2009, 2 pages.
CommVault, "Volume Shadow Services (VSS)," <http://documentation.commvault.com/commvault/release_8_0_0/books_online_1/english_us/features/snapshots/vss/vss.htm>, internet accessed on Dec. 23, 2009, 1 page.
Eitel, "Backup and Storage Management in Distributed Heterogeneous Environments," *IEEE*, Jun. 12-16, 1994, pp. 124-126.
EMC Corporation, "EMC CLARiiON CX Series," May 2006, 7 pages.
EMC Corporation, "EMC CLARiiON CX3 UltraScale Series," Feb. 2008, 6 pages.
EMC Corporation, "EMC Symmetrix DMX Series," Jan. 2008, 8 pages.
Extended European Search Report in Application No. 09815090.7, dated Oct. 25, 2012, 8 pages.
Extended European Search Report in Application No. 10841622.3, dated Jul. 29, 2015, 11 pages.
FalconStor Software, "Impact-free Backup of Vmware Environments", http://www.falconstor.com/dmdocuments/HyperTrac_for_VMware_SB_HR.pdf>, 2011, 2 pages.
FalconStor Software, "Unified Backup & DR for Vmware Environments", http://www.falconstor.com/dmdocuments/UniBU-DR_CDP_SB_100520.pdf>, 2001, 2 pages.
FalconStor Software, "Zero-impact Unified Backup & DR", <http://www.falconstor.com/solutions/solutions-for-server-virtualization/vmware-solutions/zero-impact-unified-backup-a-dr>, undated, internet accessed May 2, 2012, 1 page.
Fegreus, CommVault Simpana 8.0, Mar. 3, 2010, http://www.virtual-strategy.com/2010/03/03/commvault-simpana.
Gait, J., "The Optical File Cabinet: A Random-Access File System for Write-Once Optical Disks," *IEEE Computer*, vol. 21, No. 6, pp. 11-22 (Jun. 1988).
Garimella, N., "Understanding and Exploiting Snapshot Technology for Data Protection, Part 1: Snapshot Technology Overview," <http://www.ibm.com/developerworks/tivoli/library/t-snaptsm1/index.html>internet accessed on Dec. 22, 2009, 8 pages.
Harriman-Polanski, CommVault Galaxy Enhances Data Protection, Reprinted from Dell Power Solutions, May 2006.

Hitachi Data Systems, "Hitachi HiCommand Protection Manager Software," Feb. 2007, 2 pages.
International Search Report and Written Opinion for International Application No. PCT/US09/57102, dated Nov. 6, 2009, 14 pages.
International Search Report and Written Opinion for International Application No. PCT/US10/62146, dated Feb. 18, 2011, 9 pages.
International Search Report and Written Opinion for International Application No. PCT/US10/62158; dated Feb. 23, 2011, 8 pages.
International Search Report and Written Opinion for International Application No. PCT/US2004/038323, dated Feb. 19, 2008, 10 pages.
Jander, M., "Launching Storage-Area Net," *Data Communications*, US, McGraw Hill, NY, vol. 27, No. 4 (Mar. 21, 1998), pp. 64-72.
Managing Data More Effectively in Virtualized Environments with CommVault® Simpana® Universal Virtual Software Agent, © 1999-2009.
Marshall, David, "Veeam's SureBackup transforms VMware image backups," <http://www.infoworld.com/print/117315>, internet accessed on Mar. 23, 2010, 4 pages.
Microsoft TechNet, "How Volume Shadow Copy Service Works," <http://technet.microsoft.com/en-us/library/cc785914(WS.10,printer).aspx>, internet accessed on Dec. 17, 2009, 4 pages.
Microsoft TechNet, "Overview of Exchange Server Backup Methods," <http://technet.microsoft.com/en-us/library/aa996125(EXCHG.65,printer).aspx>, internet accessed on Dec. 29, 2009, 3 pages.
Microsoft TechNet, "What is Volume Shadow Copy Service?" Mar. 28, 2003, 5 pages.
Microsoft, "Microsoft System Center Data Protection Manager 2007: Microsoft Exchange Server," undated, 2 pages.
Microsoft, "Microsoft System Center Data Protection Manager 2007: Microsoft SharePoint Products and Technologies," undated, 2 pages.
Microsoft, "Microsoft System Center Data Protection Manager 2007: Product Overview," undated, 2 pages.
Microsoft.com, "XADM: Hot Split Snapshot Backups of Exchange," <http://support.microsoft.com/kb/311898/>, internet accessed on Dec. 29, 2009, 5 pages.
MSDN, "Backup Sequence Diagram," <http://msdn.microsoft.com/en-us/library/ms986539(EXCHG.65,printer).aspx>, internet accessed on Dec. 30, 2009, 1 page.
MSDN, "Exchange Transaction Logs and Checkpoint Files," <http://msdn.microsoft.com/en-us/library/ms986143(EXCHG.65,printer).aspx>, internet accessed on Dec. 30, 2009, 1 page.
MSDN, "Identifying Required Transaction Logs," <http://msdn.microsoft.com/en-us/library/ms986606(EXCHG.65,printer).aspx>, internet accessed on Dec. 30, 2009, 1 page.
MSDN, "Overview of Processing a Backup Under VSS," <http://msdn.microsoft.com/en-us/library/aa384589(VS.85,printer).aspx>, internet accessed on Dec. 18, 2009, 3 pages.
MSExchange.org, "Exchange log disk is full, Prevention and Remedies," <http://www.msexchange.org/articles/exchange-log-disk-full.html?printversion>, internet accessed on Dec. 30, 2009, 7 pages.
NetApp, "NetApp SnapManager for Microsoft Exchange," 2009, 2 pages.
Network Appliance, Inc., "Network Appliance Snapshot Technology," copyright 2004, 1 page.
OpenAir.com, Product Update—Jun. 21, 2001, http://web.archive.org/web/20011007153900lhttp:I|www.openair.comlhomeIn.s-ub.--p.sub.--update062101.html, Oct. 2001, 3 pages.
Oracle Corporation, "Realizing the Superior Value of Oracle ZFS Storage Appliance," Oracle White Paper, Redwood Shores, California, Mar. 2015, 12 pages.
Partial Supplementary European Search Report in Application No. 10841622.3, dated Feb. 11, 2015, 5 pages.
Robinson, Simon, "CommVault Unveils QiNetix to Unite Data Movement with Storage Management", 451 Research, Oct. 11, 2002, 3 pages.
Rosenblum et al., "The Design and Implementation of a Log-Structured File System," *Operating Systems Review SIGOPS*, vol. 25, No. 5, New York, US, pp. 1-15 (May 1991).
Tanenbaum, Andrew S. Structured Computer Organization, 1984, Prentice-Hall, Inc. second edition, pp. 10-12.

(56) References Cited

OTHER PUBLICATIONS

Veeam Software, "The New Standard for Data Protection," internet accessed on Mar. 23, 2010, 2 pages.
Veritas Software Corporation, "Veritas Volume Manager 3.2, Administrator's Guide," Aug. 2001, 360 pages.
Wikipedia.org, "Snapshot (computer storage)," <http://en.wikipedia.org/w/index.php?title=Snapshot_(computer_storage)>, internet accessed on Dec. 15, 2009, 3 pages.

* cited by examiner

SYSTEMS AND METHODS FOR ANALYZING SNAPSHOTS

CROSS-REFERENCE TO RELATED APPLICATIONS

This application is a continuation of U.S. patent application Ser. No. 13/874,323, entitled "SYSTEMS AND METHODS FOR ANALYZING SNAPSHOTS," filed Apr. 30, 2013, now U.S. Pat. No. 9,298,559, which is a continuation of U.S. patent application Ser. No. 12/978,984, entitled "SYSTEMS AND METHODS FOR ANALYZING SNAPSHOTS," filed Dec. 27, 2010, now U.S. Pat. No. 8,433,682, which claims priority to and the benefit of U.S. Patent Application No. 61/291,805, entitled "SYSTEMS AND METHODS FOR ANALYZING SNAPSHOTS," filed on Dec. 31, 2009, and is related to U.S. patent application Ser. No. 12/558,947, entitled "USING A SNAPSHOT AS A DATA SOURCE," filed on Sep. 14, 2009 and U.S. patent application Ser. No. 12/979,101 filed on Dec. 27, 2010, entitled "SYSTEMS AND METHODS FOR PERFORMING DATA MANAGEMENT OPERATIONS USING SNAPSHOTS," each of which is incorporated by reference in its entirety.

BACKGROUND

A transactional database application, such as Microsoft SQL Server or Microsoft Exchange Server, typically writes transactions to transaction logs prior to committing the transactions to the database. The database application then commits the transactions in the transaction logs to the database as permitted.

An administrator typically protects the data of the transactional database application by directing data protection software to periodically perform a full backup (or other data protection operation) of the database and the transaction logs, as well as additional incremental backups (or other data protection operations) to capture changed data. For example, the administrator may direct the software to perform a full snapshot copy of the database and the transaction logs. The administrator may then direct the software to perform additional snapshots of the database and the transaction logs to capture data that has changed, such as additional transaction logs, since the full snapshot copy was performed.

In order to recover the transactional database application as it existed at a specific point in time, the administrator typically directs the software to recover the database and then "play" the necessary transaction logs. Playing (alternatively referred to as replaying or applying) transaction logs refers to committing transactions in the transaction logs to the database. This brings the transactional database application to the state it was in at the specific point in time. However, once the administrator has recovered the transactional database application, the administrator is typically not able to play additional transaction logs to bring the transactional database application to a state at a later point in time. Stated another way, once a database is put into a state corresponding to a particular point in time in order to recover data from the database as the data existed at that particular point in time, the administrator cannot put the database into another state corresponding to another point in time in order to recover data from the database as the data existed at the other point in time.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
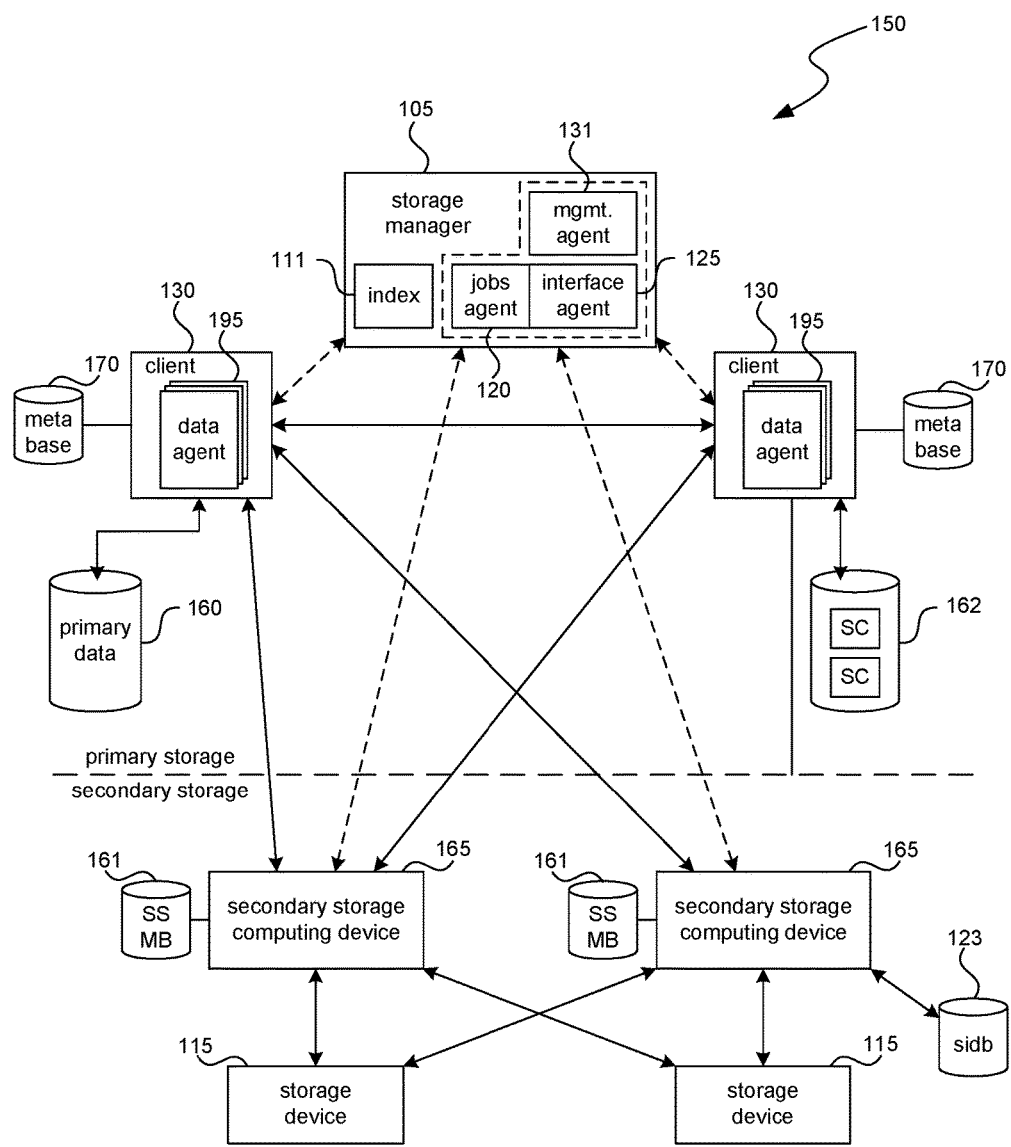
FIG. 1 is a block diagram illustrating an example of a data storage enterprise that may employ aspects of the invention.

The headings provided herein are for convenience only and do not necessarily affect the scope or meaning of the claimed invention.

Overview

This application describes, among other things, techniques for creating a second snapshot of a first snapshot of a set of data, modifying the first snapshot, and reverting the modifications to the first snapshot. For example, the described techniques may be used to play portions of one or more transaction logs into a database to put the database in a particular state that corresponds to a particular point in time. The second snapshot may then be used to revert the database to a prior state such that additional transaction logs may be played into the database. These techniques enable the database to be put into multiple states that correspond to when the database existed at multiple points in time. Therefore, data can be recovered from the database as the data existed at different points in time. Moreover, individual data objects in the database can be accessed and analyzed as the individual data objects existed at different points in time.

In some examples, these techniques described herein involve creating a first snapshot of both a database and transaction logs associated with the database. Portions of one or more transaction logs may be played to commit corresponding changes to the database. A second snapshot is then taken of the first snapshot. The database can then be analyzed as it existed as of the time that the transaction logs were played into the database. Using the example of a Microsoft Exchange database, the database can be analyzed to read data from individual mailboxes, emails, attachments, etc. The second snapshot is then used to revert the database to the state it existed in as of the time the second snapshot was taken. Any number of transaction logs can then be played in order to put the database in a state that the database existed in at multiple points in time.

In some examples, the techniques described herein involve utilizing replication logs to take snapshots of a replication copy of data. The replication logs indicate changes to a first set of data, and can be used to replicate the changes to a second set of data that is a copy of the first set of data as the first set of data existed at a first point in time. The replication logs include at least one marker indicating a second point in time at which the first set of data is consistent. At least some of the replication logs are utilized to replicate at least some of the changes to the second set of data. Upon reaching the marker in the replication logs, a snapshot of the second set of data is created. The snapshot of the second set of data is analyzed, which may include accessing individual data objects within the second set of data.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 2:
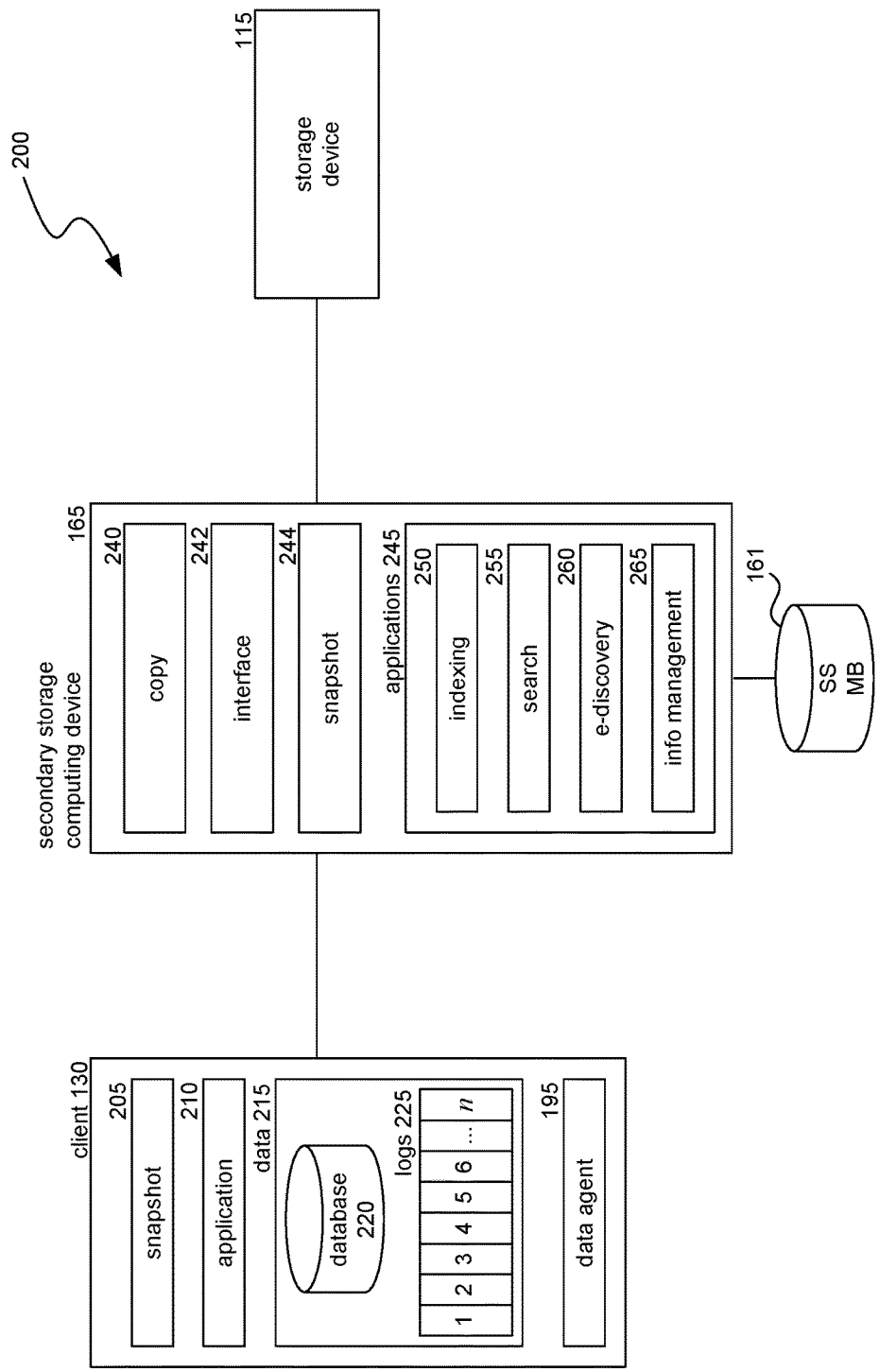
FIG. 2 is a block diagram illustrating in more detail certain components of a data storage system according to some examples.

FIGS. 1 and 2 and the discussion herein provide a brief, general description of suitable specialized environments in which aspects of the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," "client," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on computer-readable media, including tangible computer-readable storage media such as magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Aspects of the invention will now be described in detail with respect to FIGS. 1 through 4. FIG. 1 illustrates an example of a data storage system that may employ aspects of the invention. FIG. 2 illustrates in more detail certain components of the example data storage system of FIG. 1.

Figure 3:
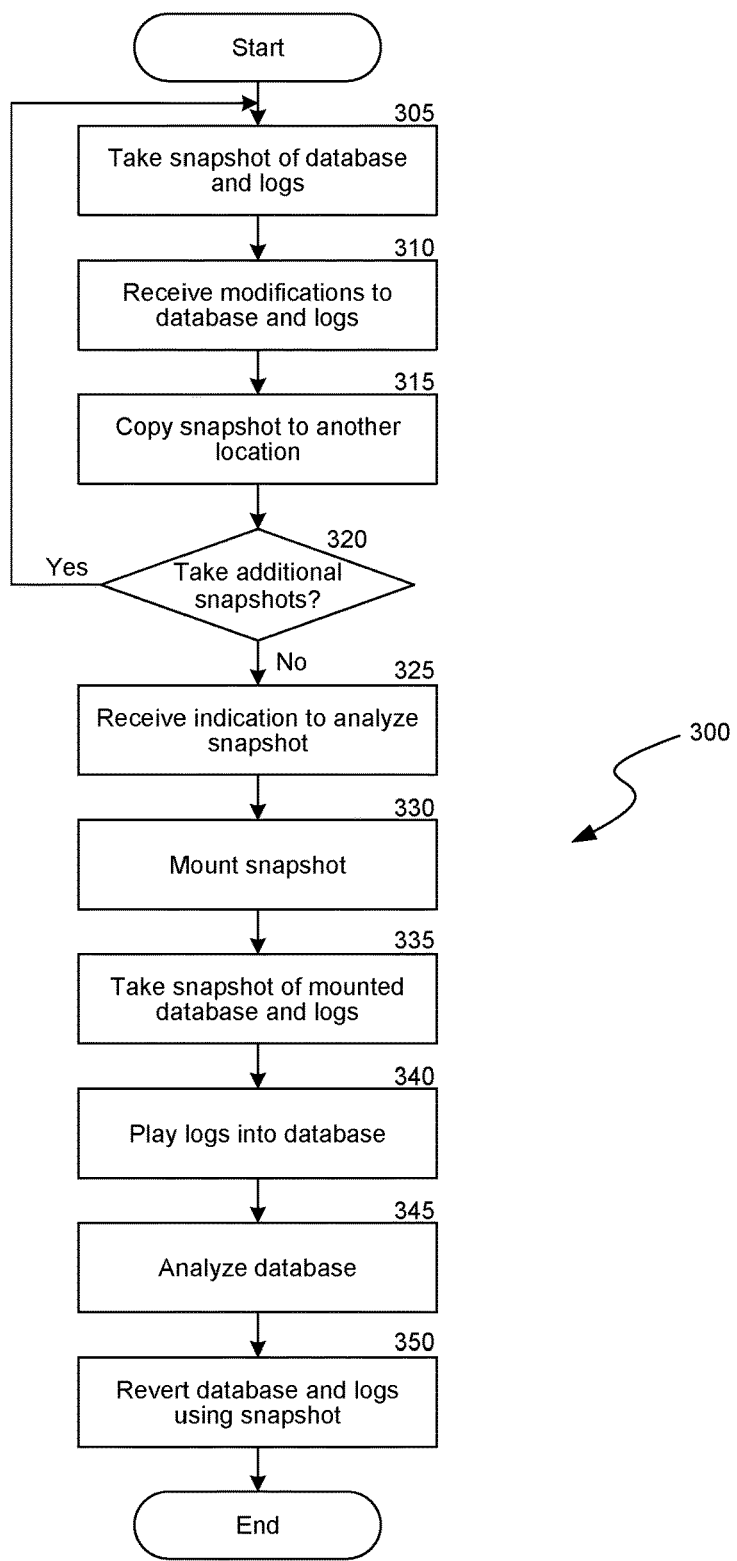
FIG. 3 is a flow diagram of a process for analyzing a snapshot.
Figure 4A:
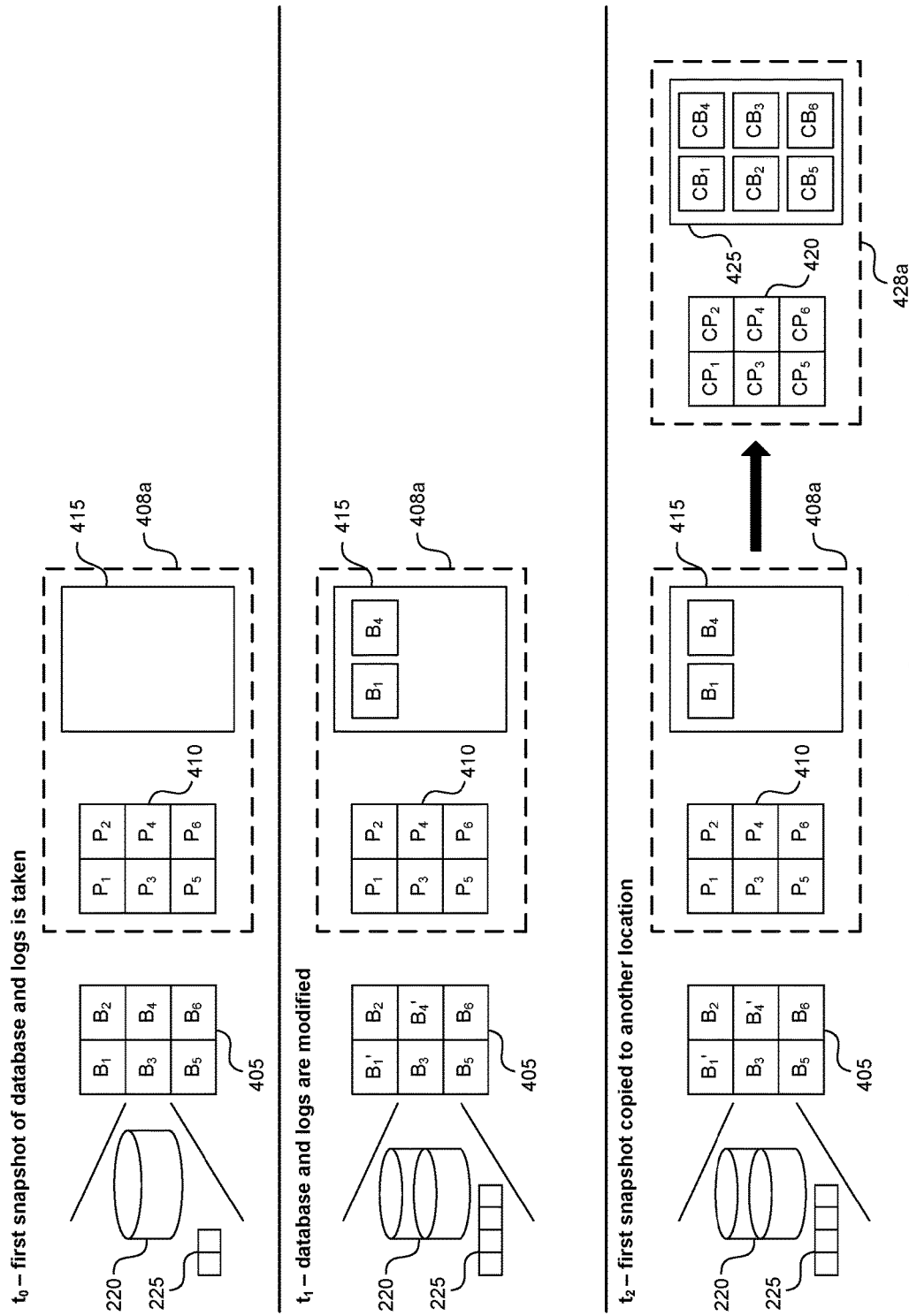
FIGS. 4A-4E are diagrams illustrating aspects of the process of FIG. 3.
Figure 4B:
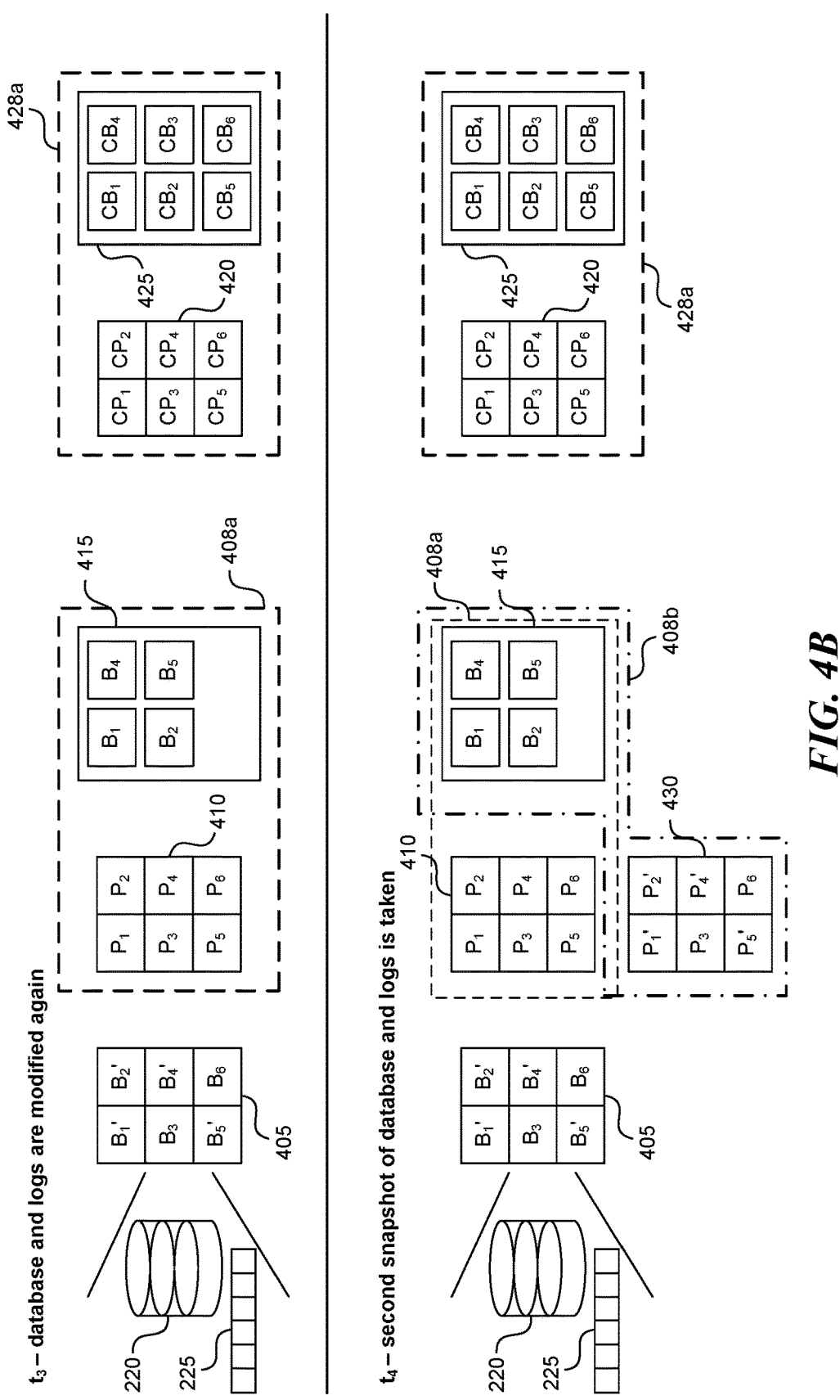
Figure 4C:
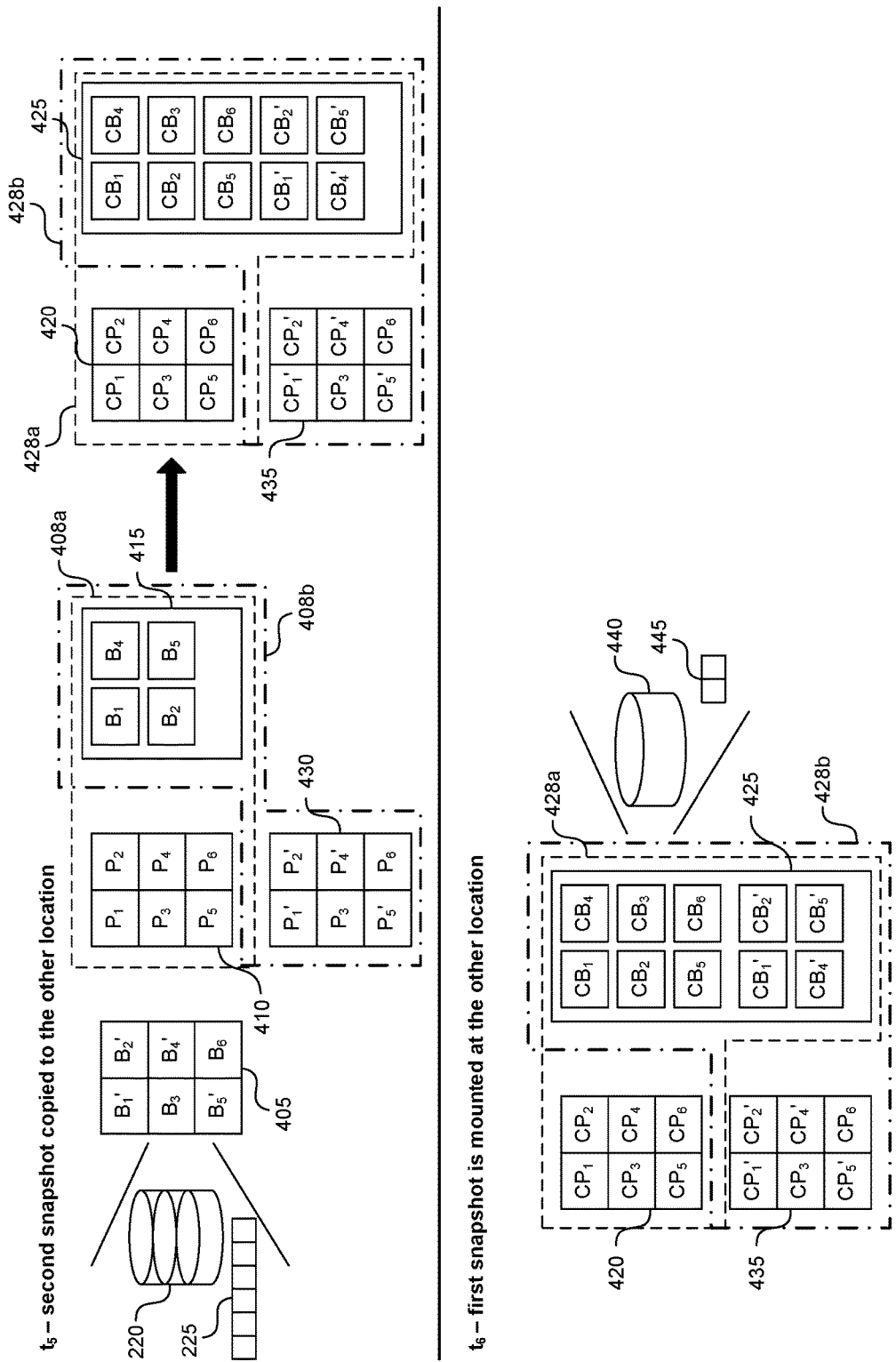
Figure 4D:
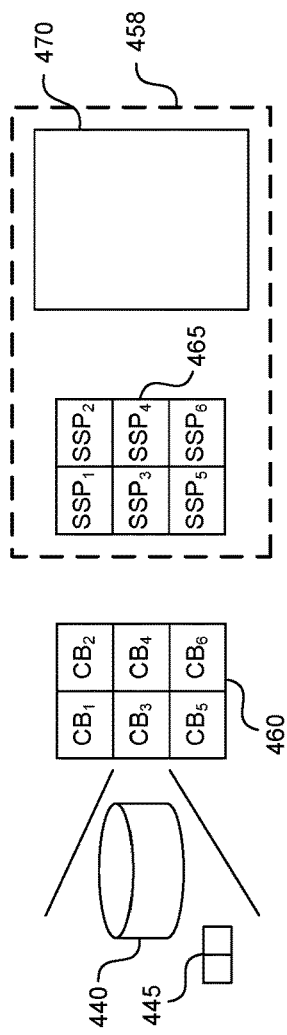
Figure 4D:
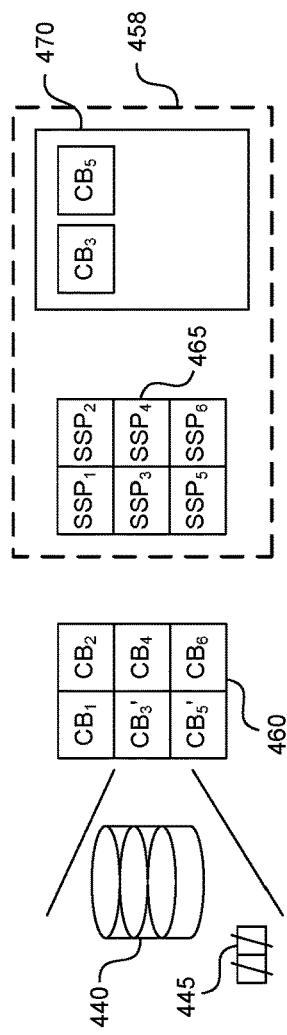
Figure 4E:
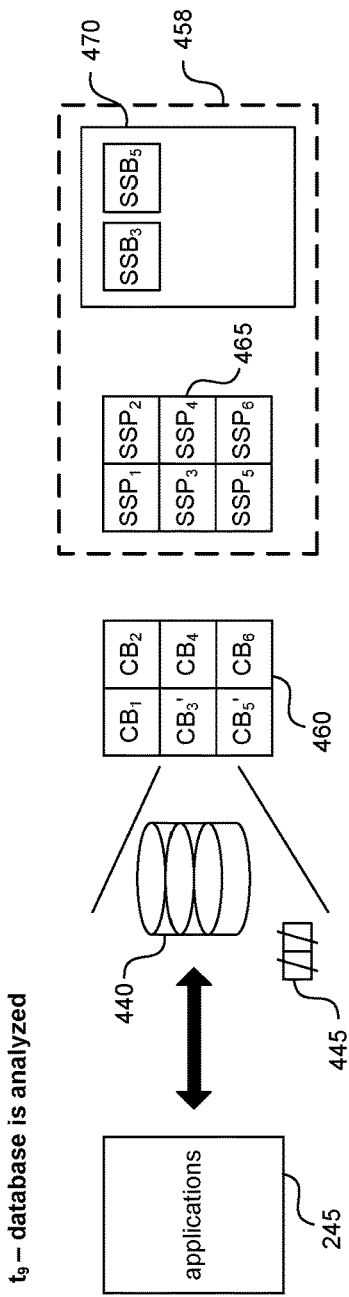
Figure 4E:
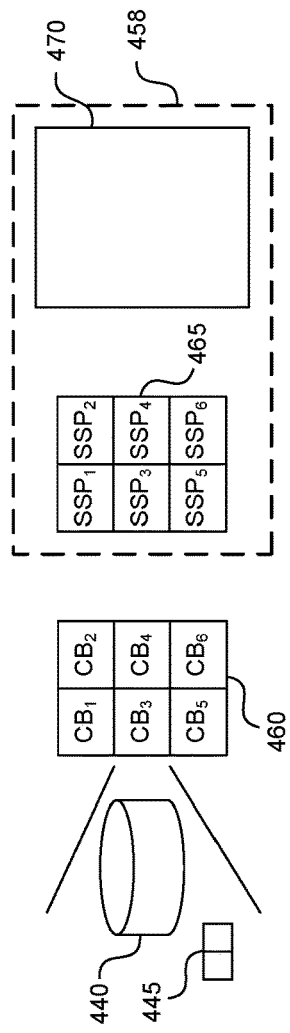
Figure 5:
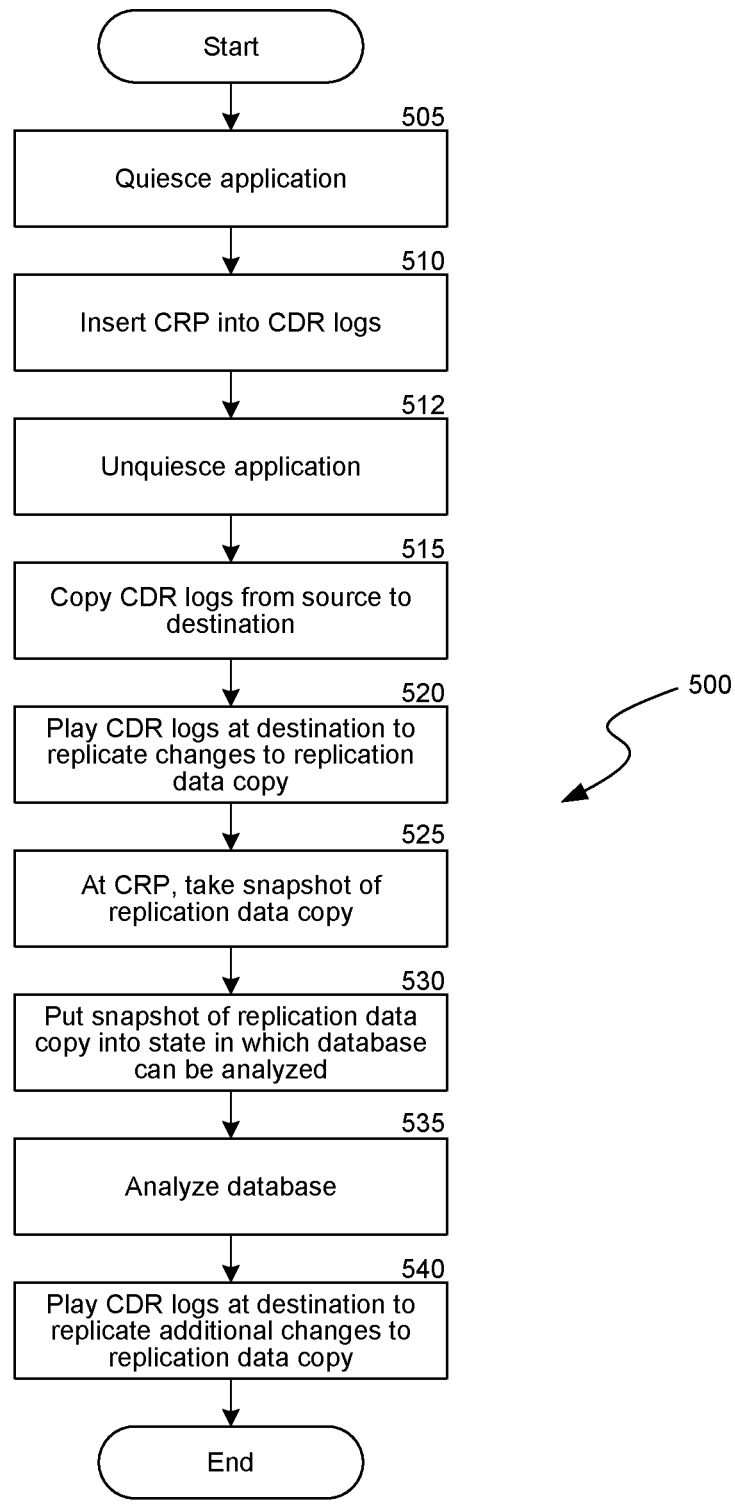
FIG. 5 is a flow diagram of another process for analyzing a snapshot.

FIG. 3 illustrates a process for creating a second snapshot of a first snapshot of a set of data, such as a database and associated logs. FIGS. 4A-4E illustrate aspects of the process of FIG. 3 in more detail. FIG. 5 illustrates a process for utilizing consistency points to take snapshots of a set of data, such as a database and associated logs, in a data replication process.

Suitable Data Storage System

FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, and a single instancing database 123. The storage manager 105 includes an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. A "retention policy" may specify how long data is to be retained at specific tiers of storage or what criteria must be met before data may be pruned or moved from one tier of storage to another tier of storage. In some cases, the storage policy includes information generally specified by the schedule policy and/or the retention policy. (Put another way, the storage policy includes the schedule policy and/or the retention policy.) Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

The clients 130 typically include application software for performing various operations. Clients 130 typically also include an operating system on which the application software runs. A file system can be provided to facilitate and control file access by the operating system and application software. File systems can facilitate access to local and remote storage devices for file or data access and storage. Clients 130 can also include local storage such as a media module media drive with fixed or removable media.

In some examples, the clients 130 include storage mechanisms for allowing computer programs or other instructions or data to be loaded into memory for execution. Such storage mechanisms might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to memory.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195.

As used herein, the term module might describe a given unit of functionality that can be performed in accordance with one or more embodiments of the present invention. As used herein, a module might be implemented utilizing any form of hardware, software, firmware, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The overall system 150 may employ multiple data agents 195, each of which may perform storage operations on data associated with a different application. For example, different individual data agents 195 may be designed to handle Microsoft Exchange data, Lotus Notes data, Microsoft Windows file system data, Microsoft Active Directory Objects data, Microsoft SQL Server data, Microsoft Sharepoint Server data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange Database data agent 195 to back up the Exchange databases, one Microsoft Exchange Public Folder data agent 195 to back up the Exchange Public Folders, and one Microsoft Windows File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); 6) U.S. patent application Ser. No. 12/565,576 (entitled SYSTEMS AND METHODS FOR MANAGING SINGLE INSTANCING DATA); or 7) U.S. patent application Ser. No. 12/647,906 (entitled BLOCK-LEVEL SINGLE INSTANCING), each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. patent application Ser. No. 12/649,454 (entitled STORING A VARIABLE NUMBER OF INSTANCES OF DATA OBJECTS).

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, each secondary storage computing device 165 has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Suitable System for Creating Snapshots

FIG. 2 is a block diagram illustrating in more detail certain components 200 of the data storage system 150 of FIG. 1. FIG. 2 depicts one of the clients 130, secondary storage computing device 165, secondary storage computing device index 161, and storage device 115.

In addition to the data agent 195, the client 130 includes a snapshot component 205, an application 210, and data 215. The application 210 may be any application executing on the client 130, such as a database server application (for example, Microsoft SQL server, Microsoft Active Directory Server, Oracle, etc.), an email server application (for example, Microsoft Exchange Server, Apache, etc.), or other types of servers (for example, application servers such as Microsoft SharePoint servers or web servers, virtual machine servers such as Microsoft Virtual Server, file servers, etc.). The application 210 has associated data 215, which includes a database 220 and logs 225, shown as logs one through n. The application 210 may write data to the database 220 using transactional techniques. That is, the application 210 may write changes to the logs 225 before committing the changes to the database 220.

For example, consider an application 210 that is an email server application 210, such as Microsoft Exchange. The email server application 210 has an associated database 220 to which it writes its data in a transactional manner. The data 215 of the application also includes logs 225. For example, logs one and two may exist as of day one. A full copy of the database 220 and its logs 225 that occurs on day one may result in copying the database 220 and logs one and two. On day two, the email server application 210 creates logs three and four, and an incremental copy of the database 220 and its logs 225 on day two would only copy logs three and four. On day three, logs five and six are created, and an incremental copy of the database 220 and its logs 225 on day three would copy over logs five and six. Accordingly, the state of the data 215 of the email server application 210 can be recovered to multiple points in time over days one through three, by playing portions of the appropriate logs 225 into the database 220. Further incremental copies of additional logs 220 can be made at later points in time. Although this example describes that the email server application 210 creates two logs 225 each day, those of skill in the art will understand that any number of logs (i.e., zero logs, one log, or greater than two logs) may be created each day.

The snapshot component 205 creates snapshots of the data 215 of the client 130. The snapshot component 205 includes software components and may also include hardware and/or firmware components. The snapshot component 205 may be provided in its entirety by a single entity (for example, a single vendor), or the snapshot component 205 may include sub-components that are provided by different entities (such as multiple vendors).

In some examples, the snapshot component includes a Microsoft Volume Shadow Copy Service (VSS) sub-component and a software-based VSS provider sub-component that is provided by the assignee of the present application, CommVault Systems, Inc. In these examples, the data agent 195 interacts with the Microsoft VSS sub-component to create snapshots. The Microsoft VSS sub-component notifies the application 210 to prepare the data 215 for creating a snapshot. The application 210 prepares the data 215 in an appropriate manner (such as completing open transactions, flushing application caches, etc.). The Microsoft VSS sub-component initiates a commit phase and notifies the application 210 that the application 210 should be quiesced and to freeze writes to the data 215. The Microsoft VSS sub-component may also flush a file system buffer and freeze the file system to ensure that file system metadata is written and that the data 215 is written in a consistent order. The Microsoft VSS sub-component notifies the VSS provider sub-component to create the snapshot, and the VSS provider sub-component creates the snapshot. The Microsoft VSS sub-component then "thaws" or resumes file system operations and notifies the application 210 that the application 210 can unquiesce and complete any writes to the data 215.

In other examples, in addition to or as an alternative to the software-based VSS provider sub-component, the snapshot component 205 includes other software-based VSS provider sub-components, such as a Microsoft system software provider, a Microsoft Data Protection Manager provider sub-component or a NetApp SnapManager provider sub-component. These other software-based VSS provider sub-components may create snapshots in manners similar to the manner described in the preceding paragraph, or may use other techniques to create snapshots.

In other examples, in addition to the Microsoft VSS sub-component, the snapshot component 205 includes one or more hardware-based VSS provider sub-components, such as those provided by vendors such as Hewlett-Packard, EMC, NetApp, IBM, and other vendors. These hardware-based VSS provider sub-components may create snapshots in manners similar to the manner described above, or may use other techniques to create snapshots. Those of skill in the art will understand that the snapshot component 205 may include various software-based and/or hardware-based sub-components and interact with other components in various ways in order to create snapshots of the data 215.

The snapshot component 205 may create snapshots using various techniques, such as copy-on-write, redirect-on-write, split mirror, copy-on-write with background copy, log structure file architecture techniques, continuous data protection techniques, and/or other techniques. The snapshot component 205 may store the created snapshots on a particular volume of the client 130.

The secondary storage computing device 165 includes a copy component 240 that copies snapshots from the client 130 to another storage device, such as storage device 115. The secondary storage computing device 165 also stores certain snapshot information and/or snapshot metadata in various data structures as described herein. The secondary storage computing device 165 may store snapshot information and/or snapshot metadata in secondary storage computing device index 161.

The secondary storage computing device 165 also includes an interface component 242. The interface component 242 provides access to the copied snapshot data. The interface component 242 can be used to access data objects created in other types of secondary copies, such as backup copies, archive copies, and other types of copies. The interface component 242 can also be used to display to a user available snapshots or point in time copies of the data 215 that can be used for recovery or other purposes. The secondary storage computing device 165 also includes a snapshot component 244. The snapshot component 244 may function similarly to the snapshot component 205.

The secondary storage computing device 165 also includes applications 245 that perform various functions using copied snapshot data. The applications 245 include an indexing component 250, a search component 255, an e-discovery component 260, and an information management component 265. As described in more detail herein, the applications 245 access copied snapshot data stored on storage device 115 and data structures stored in secondary storage computing device index 161 in order to perform various functions.

Analyzing Snapshots

FIG. 3 is a flow diagram of a process 300 for analyzing a snapshot (alternatively referred to as mining a snapshot), and FIGS. 4A-4E illustrate aspects of the process 300 in more detail. The process 300 is described using the example of a transactional application 210 having associated data 215, which includes a database 220 and logs 225. As can be seen in FIGS. 4A-4E, the database 220 and associated logs 225 are stored as blocks $B_1$ through $B_6$ 405 on a storage device associated with the client 130.

The process 300 begins at step 305 (time $t_0$), where the snapshot component 205 accesses the database 220 and associated logs 225 and creates a first snapshot 408a of the database 220 and associated logs 225. See FIG. 4A. For example, the snapshot component 205 may use a copy-on-write technique to create the first snapshot, and the process 300 is described using this example (although other techniques for creating snapshots may be used). The first snapshot 408a includes a set of pointers $P_1$ through $P_6$ 410 (that point to blocks $B_1$ through $B_6$, 405, respectively) and storage location 415 for blocks.

At step 310 (time $t_1$), the application 210 modifies the database 220 and logs 225. For example, the application 210 may commit changes in certain logs 225 to the database 220 and/or create new logs 225. These changes may result to modifications to blocks $B_1$ and $B_4$ (which become blocks $B_1'$ and $B_4'$, respectively). Prior to their modification, the snapshot component 205 copies blocks $B_1$ and $B_4$ to storage location 415. Pointers $P_1$ and $P_4$ may now point to blocks $B_1$ and $B_4$ in storage location 415, rather than $B_1$ and $B_4$ in storage location 405.

At step 315 (time $t_2$), the copy component 240 copies the first snapshot 408a to another location, such as the storage device 115, thereby creating a copy 428a of the first snapshot 408a. See FIG. 4B. For example, the copy component 240 may copy the first snapshot 408a as part of a backup process. The copy component 240 creates a copy set of blocks (blocks $CB_1$ through $CB_6$, 425) and a copy set of pointers that point to the copy set of blocks ($CP_1$ through $CP_6$ 420). Additionally or alternatively, the first snapshot 408a may be transferred to the other location as part of a background copy process or using other techniques as known to those of skill in the art.

At step 320, the snapshot component 205 determines whether to take additional snapshots of the database 220 and logs 225. For example, the snapshot component 205 may be programmed to create snapshots periodically, such as once a day at, for example, 2:00 a.m. As another example, an administrator may request that the snapshot component 205 create additional snapshots of the database 220 and logs 225, such as on an ad-hoc basis. If the snapshot component 205 is to take additional snapshots, the process 300 returns to step 305, and additional snapshots are created (e.g., snapshot 408b), the database 220 and logs 225 may be modified, and the additional snapshots (e.g., snapshot 408b) are copied to the other location (e.g., creating snapshot copy 428b). As shown in FIGS. 4B-4C, these additional steps occur at times $t_3$ through $t_5$, where blocks $B_2$ and $B_5$ are now changed and copied out (before being changed) to storage location 425.

If the snapshot component 205 is not to take additional snapshots at this time, the process 300 continues at step 325, where the secondary storage computing device 165 receives an indication to analyze a copy of a snapshot copied to the other location (e.g., snapshot copy 428a or snapshot copy 428b). For example, the secondary storage computing device 165 may receive a request to obtain a data object (for example, an email message, a mailbox, a message store, etc.) stored in the database 220 and logs 225.

At step 330 (time $t_6$), the snapshot component 244 mounts the snapshot copy 428a at the other location. Mounting the snapshot copy 428a creates a read-write copy of the database 440 and logs 445. See FIG. 4C.

At step 335 (time $t_7$), the snapshot component 244 creates a snapshot 458 of the database 440 and logs 445. This creates a set of pointers ($SSP_1$ through $SSP_6$ 465) and a storage location 470. See FIG. 4D.

At step 340 (time $t_8$), the snapshot component 244 plays the logs 445 into the database 440. For example, if the snapshot 458 is created by a hardware-based sub-component, the snapshot 458 may be read/write, and the snapshot component 244 can modify the snapshot 458 any time after creating the snapshot 458. As another example, if the snapshot 458 is created by a software-based sub-component, the snapshot component 244 may have a window of time immediately following the creation during which the snapshot component 244 can modify the snapshot 458. The snapshot component 244 may play all or portions of one or more logs 445 into the database 440. Playing the logs 445 into the database 440 modifies certain blocks (as shown, blocks $CB_3$ and $CB_5$, which become blocks $CB_3'$ and $CB_5'$, respectively). (If the logs and snapshots include insufficient detail to make certain changes to the database, the system may also create and maintain an index of changes that map changes recorded by the snapshots with files or data objects changed, so that the system can identify specific blocks that may need to be restored before analysis is performed.) Before the blocks are modified, the snapshot component 244 copies the blocks (blocks $CB_3$ and $CB_5$) to storage location 470. See FIG. 4D.

After the snapshot component 244 plays logs 445 into the database 440, the database 440 may be in a state in which additional logs 445 cannot be played into the database 440. For example, a bit or flag may be set in the database 440 indicating that further logs 445 cannot be played into the database 445. In some examples, the snapshot component 244 creates the snapshot 458 of the database 440 and logs 445 after playing the logs 445 into the database 440.

At step 345 (time $t_9$), the applications 245 analyze the database 445 and logs 445. See FIG. 4E. For example, the applications 245 may analyze the database 445 and logs 445 in order to, for example, analyze individual data objects within the database 445 and logs 445. The applications 245 may analyze the database 445 and logs 445 to perform various functions on individual data objects. For example, the applications 245 may index individual data objects, classify individual data objects, extract individual data objects from the set of data in order to or copy restore individual data objects to other locations, deduplicate individual data objects, and/or perform other functions. More details as to functions that may be performed on the database 445 and logs 445 are described in the previously-referenced U.S. patent application Ser. No. 12/979,101, now U.S. Pat. No. 8,595,191, entitled "SYSTEMS AND METHODS FOR PERFORMING DATA MANAGEMENT OPERATIONS USING SNAPSHOTS."

At step 350 (time $t_{10}$), the snapshot component 244 reverts the mounted database 445 and logs 440 to the state they were at the time the snapshot 458 was created (time $t_7$). For example, the snapshot component 244 may revert the mounted database 445 and logs 440 by performing a VSS revert operation using the snapshot 458. Additionally or alternatively, the snapshot component 244 may use revert operations other than VSS revert operations and/or other techniques to revert the mounted database 445 and logs 440. See FIG. 4E. The process may then loop back to block 305 and take additional snapshots, or end.

Performing a revert operation reverts the mounted database 445 and logs 440 to the state they were in at the time the snapshot 458 was created (time $t_7$). For example, if the snapshot 458 was created before the mounted database 445 and logs 440 were modified by playing logs 445 into the database 440, performing a revert operation on the mounted database 440 and logs 445 will revert mounted database 445 and logs 440 to the state it was in before playing the logs 445 into the database 440. This puts the database 440 into a state such that additional logs 445 can be played into it. For example, if the snapshot component 244 had previously created the snapshot 458 of the mounted database 445 and logs 440 and then played logs one and two into the database 440, the snapshot component 244 can then play additional logs 445 (for example, logs three to n) into the database 440.

As another example, if the snapshot of the mounted database 445 and logs 440 was taken after the mounted database 445 and logs 440 were modified, performing a revert operation will revert the mounted database 445 and logs 440 to the state they were in after being modified (for example, after logs 445 were played into the database 440). This also offers the opportunity to play additional logs 445 (such as those from later snapshots) into the database 440 in order to put the database 440 into the state it existed in at multiple points in time.

Accordingly, using snapshots in this way preserves the integrity of the database 440 in such a way that it can be used for both analyzing the data in the database 440 and the logs 445, as well as using the database 440 and the logs 445 to perform a full recovery of the database 440 and logs 445, or to perform restores of individual data objects within the database 440 and logs 445.

In order to analyze the data in the database 440 and logs 445, certain logs 445 may need to be played into the database 440. For example, to analyze the state of the data 215 as it existed at the end of day one, logs one and two would need to be played into the database 440. However, playing such logs 445 into the database 440 may preclude the possibility of playing additional logs 445 into the database 440. Taking a snapshot of the mounted database 440 and logs 445 solves this problem by enabling the ability to revert the data 215 to the state it existed in prior to or immediately after the playing of certain logs 445 into the database 440. The techniques described herein facilitate putting the data 215 into a state at a specific point in time, analyzing the data 215 as it existed at that specific point in time, and then performing a revert operation upon a snapshot of the data 215 in order to revert the data to a state in which additional logs 445 may be played into the database 440, or in which all or portions of the data 215 can be recovered.

Accordingly, the data 215 can be analyzed (for example, individual data objects may be indexed, searched, extracted, recovered, etc.), and then such individual data objects can be also analyzed at a later point in time in order to pick up any later changes to the individual data objects. For example, an email message in an email server application database 220 and logs 225 may have a first state at a first point in time. Using the techniques described herein, the snapshot component 205 can put the database 220 in the first state at the first point in time and extract the email message from the database 220. The snapshot component 205 can then revert the database 220 to a prior state, and then play additional logs 225 into the database 220, to recover the email message as it existed at a second, later point in time. After step 415, the process 400 concludes.

In some examples, the techniques described herein may be used on copies of data created other than by snapshot operations. For example, the secondary storage computing device 165 may create copies of the database 220 and logs 225 by performing backup operations on the database 220 and logs 225. The secondary storage computing device 165 may create a full backup of the database 220 and logs one and two on day one. On day two, the email server application 210 creates logs three and four, and an incremental backup of the database 220 and logs 225 on day two would only backup logs three and four. On day three, logs five and six are created, and an incremental backup of the database 220 and logs 225 on day three would backup logs five and six. The following table illustrates this example:

| Day/Time | Type of backup | Data |
| --- | --- | --- |
| Day 1/11:00 p.m. | Full | Database, logs one and two |
| Day 2/11:00 p.m. | Incremental | Logs three and four |
| Day 3/11:00 p.m. | Incremental | Logs five and six |

Utilizing Consistent Recovery Points to Create Snapshots that can be Analyzed

In some examples, the techniques described herein may be used on copies of data created by replication operations such as CDR (Continuous Data Replication), DDR (Discrete Data Replication), and other replication operations. For example, for data protected by a replication operation, multiple Consistent Recovery Points (CRPs, alternatively referred to as markers) can be established, and snapshots can be taken at such CRPs. To create a CRP, the system suspends writes to the data, and inserts the CRP into the CDR logs that indicate changes to the data. The system then copies the first CDR logs to another location. The system can play the CDR logs to replicate the changes to a copy of the data at another location (the replication data copy). When the system arrives at or reaches the CRP, the system can take a snapshot of the replicated data copy. The system can then modify the snapshot of the replicated data copy (for example, by playing application logs into an application database) so that the snapshot of the replicated data copy can be analyzed.

FIG. 5 is a flow diagram of a process 500 for analyzing a snapshot (alternatively referred to as mining a snapshot). The process 500 is described using the example of a transactional application 210 having associated data 215, which includes a database 220 and logs 225. The transactional application 210 executes on a source computing system (e.g., the client 130). A copy of the data 215 as the data 215 existed at a first point in time is stored on a destination computing system (e.g., the secondary storage computing device 165). The copy of the data 215 is referred to as the replication data copy. As changes to the data 215 are made, such changes are tracked in CDR logs on the source computing system.

The process 500 begins at step 505, where the snapshot component 205 quiesces the application 210. Quiescing the application 210 puts the data 215 into a state in which the data 215 is consistent or stable. The snapshot component 205 can quiesce the application 210 using the VSS sub-component. The VSS sub-component can then notify the VSS provider sub-component to create the snapshot. However, the VSS provider sub-component does not create a snapshot. Instead, at step 510, which occurs at a second point in time after the first point in time, the snapshot component 205 inserts a CRP into the CDR logs. The CRP may be places at predetermined periodic intervals, such as every hour or every midnight, or sporadically upon user command. At step 512 the snapshot component (e.g., the VSS sub-component) unquiesces the application 210.

At step 515, the data agent 195 copies the CDR logs from the source computing system to the destination computing system. The copying can be done periodically, as the CDR logs are created, using other techniques. At step 520, the destination computing system plays the CDR logs to replicate changes to the data 215 to the replication data copy stored at the destination computing system. At step 525, the destination computing system arrives at or reaches the CRP in the CDR logs and takes a snapshot of the replication data copy with the logs replayed (i.e. changes to the data populated based on the changes indicated in the logs).

At step 530, the destination computing system puts the snapshot of the replication data copy into a state at which the application data can be analyzed (e.g., a clean shutdown state). To do so, the destination computing system can play the logs 225 into the database 220 of the snapshot of the replication data copy, as described herein. At step 535 the destination computing system analyzes the database 220, as described herein. The destination computing system can access one or more individual data objects in the database 220 (e.g., emails, files, etc.) At step 540, the destination computing system continues playing CDR logs to replicate additional or other changes to the replication data copy at the destination computing system. The process 500 then concludes.

Additionally or alternatively, instead of analyzing the snapshot of the replication data copy, the destination computing system can analyze the replication data copy. To do so, the destination computing system plays the logs 225 into the database 220 of the replication data copy. Such modifications prevent the destination computing system from playing the CDR logs to replicate changes to the replication data copy. After analyzing the replication data copy, the destination computing system can then utilize the revert functionality of the snapshot to revert the replication data copy to the state it was in prior to the playing of the logs 225 into the database 220. Such reversion allows the destination computing system to play the CDR logs into the replication data copy.

The process 500 provides several advantages. One advantage is that control over when the data 215 on the source computing system is to be snapshotted is located on the source computing system, while the actual snapshotting occurs on the destination computing system. Such division between an instruction to take a snapshot and the creation of the snapshot according to the instruction can save resources on the source computing system. Another advantage is that the snapshot taken on the destination computing system, although not application-aware (because the application is not executing on the destination computing system), can be considered as application-aware, because the snapshot is taken at a time when the replication data copy is consistent. Other advantages will be apparent to those of skill in the art.

Additional Examples

In some examples, both snapshot operations and non-snapshot operations may be used. For example, an initial full copy and snapshot may be taken of the database 220 and logs 225. Subsequent to the initial snapshot, incremental copies or snapshots of the database 220 and logs 225 may be made. Those of skill in the art will understand that various techniques may be used to protect the database 220 and logs 225.

Other Uses of Data Copies

Copies of data created using the techniques described herein may be utilized in other fashions. For example, a first snapshot of a database 220 and logs 225 could be mounted for use by a client 130 other than the original client 130 (for example, for use as a standby server). Prior to being mounted, a second snapshot could be made of the first snapshot in order to be able to back out or undo any changes to the first snapshot by the mounting and subsequent use.

As another example, after the first snapshot of the database 220 and logs 225 is mounted by the other client 130, tests could be run on the first snapshot in order to validate or verify the first snapshot (e.g., to ensure that the database 220 and logs 225 was correctly copied, such as by reading individual data objects in the database 220 and logs 225). For example, data could be read out of the database 220 and logs 225 and compared to data read out of the copy of the database 220 and logs 225 to ensure that the data is valid (e.g., by creating checksums of the data and comparing the checksums). This could obviate the need to validate or verify the first snapshot by restoring the first snapshot to its original location, which could be a lengthy process. Tests could also be run on the first snapshot to check the integrity of the original database 220 and logs 225.

Snapshots may be taken of copies of data created by non-snapshot operations in order to perform these and other functions described herein.

Conclusion

From the foregoing, it will be appreciated that specific examples of data storage systems have been described herein for purposes of illustration, but that various modifications may be made without deviating from the spirit and scope of the invention. For example, although snapshot operations may have been described, the systems may be used to perform many types of storage operations (e.g., backup operations, restore operations, archival operations, copy operations, Continuous Data Replication (CDR) operations, recovery operations, migration operations, HSM operations, etc.). Accordingly, the invention is not limited except as by the appended claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide suitable instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the inventors reserve the right to add additional claims after filing the application to pursue such additional claim forms for other aspects of the invention.

I claim:

1. A system for analyzing a snapshot of a set of data, the system comprising:
   at least one processor;
   a memory coupled to the at least one processor and storing instructions, wherein the instructions, when executed by the processor perform a method to:
      create a first snapshot of the set of data at a first time, wherein the first snapshot includes pointers to data in the set of data;
      create a copy of the first snapshot at a second time, wherein the second time is after the first time;
      receive a user request to access, via the first snapshot, at least one of multiple data objects in the set of data;
      access, based on the received user request, the at least one of the multiple data objects,
         wherein the access includes modifying a full copy of the set of data based on: the first snapshot, the log of changes, or both the first snapshot and the log of changes; and
         wherein the snapshot component is further configured to create, prior to the access, a snapshot of the copy of the first snapshot and associated transaction logs;
      receive an instruction to change at least a portion of the set of data to another state; and
      change the set of data to the other state of based at least in part on the copy of the first snapshot.

2. The system of claim 1, wherein the method modifies the first snapshot after creating the copy of the first snapshot, wherein the set of data includes a database and database logs, and wherein the snapshot component modifies the first snapshot by playing one or more database logs into the database.

3. The system of claim 1, wherein the set of data is associated with an application, and wherein the application includes an email server, a Structured Query Language (SQL) server, a file server, or an application server.

4. The system of claim 1, wherein the method performs at least one operation on the accessed multiple data objects, wherein performing the at least one operation includes— indexing the accessed multiple data objects and adding information to an index, or associating the accessed multiple data objects with one or more classifications and storing the one or more classifications in a metabase, or extracting the accessed multiple data objects from the set of data and copying the multiple data objects to a storage device.

5. At least one computer-readable medium, excluding transitory signals, and carrying instructions, which when executed by at least one data processing device, performs a method to analyze a snapshot of a set of data, the method comprising:

causing to be generated, by the least one data processing device, a first snapshot of a set of data at a first time,
wherein the first snapshot captures a first state of the set of data at the first time, and
wherein the set of data includes multiple data objects;

causing to be generated a copy of the first snapshot at a second time,
wherein the copy of the first snapshot includes a copy of logical associations for the first snapshot, and
wherein the copy of the first snapshot captures a second state of the set of data at the second time;

causing to be generated, before an accessing of the at least one of the multiple data objects, a snapshot of the copy of the first snapshot and at least one associated transaction log;

permitting to be accessed, via the first snapshot, at least one of the multiple data objects; and reverting to the second state of the set of data.

6. The tangible computer-readable medium of claim 5, further comprising modifying the first snapshot before the second snapshot is generated.

7. The tangible computer-readable medium of claim 5, further comprising modifying the first snapshot after the second snapshot is generated.

8. The tangible computer-readable medium of claim 5, wherein causing the first snapshot of the set of data to be generated includes causing to be generated the first snapshot of the set of data at least partly with a software-based snapshot provider.

9. The tangible computer-readable medium of claim 5, wherein causing the first snapshot of the set of data to be generated includes causing to be generated the first snapshot of the set of data at least partly with a hardware-based snapshot provider.

10. The tangible computer-readable medium of claim 5, wherein the set of data includes a database and database logs, and the method further comprises modifying the first snapshot by playing one or more database logs into the database.

11. The tangible computer-readable medium of claim 5, wherein reverting to the second state of the set of data includes performing a revert operation utilizing the snapshot of the copy of the first snapshot.

12. The tangible computer-readable medium of claim 5, wherein the set of data is utilized by an application, and wherein the application includes either an email server, a Structured Query Language (SQL) server, a file server, or an application server.

13. The tangible computer-readable medium of claim 5, further comprising, modifying the first snapshot, and after reverting to the second state of the set of data, modifying the first snapshot again.

14. The tangible computer-readable medium of claim 5, further comprising causing at least one operation on the accessed one or more multiple data objects to be performed, wherein the at least one operation includes— indexing the multiple data objects and adding information to an index, or associating the multiple data objects with one or more classifications and storing the one or more classifications in a metabase, or extracting the multiple data objects from the set of data and copying the multiple data objects to a storage device.

15. A computer-implemented method, comprising:

causing to be created at least one log of changes made to a set of data between a first time and a later second time;

after the first time and before the second time, causing multiple snapshots to be created,
wherein each snapshot represents a different state of the set of data after the first time and before the second time;

identifying a point in time to provide a copy of at least one data object in the set of data,
wherein the point in time is after the first time and before the second time, and
wherein the one data object was changed after the first time and before the second time; and before the one data object is accessed, and wherein the one data object was changed after the first time and before the second time, causing a copied snapshot of the one of multiple snapshots to be created, and,
wherein at least some of the data objects in the set of data as changed between the first time and the second time are accessible via the copied snapshot.

16. At least one computer-readable medium, excluding transitory signals, and carrying instructions, which when executed by at least one computing device, performs a method of analyzing data, the method comprising:

receiving at least one replication log indicating at least one change to first data, wherein—
the first data includes one or more individual data objects,
the least one replication log can be utilized to generate the at least one change to second data that is a copy of the first data as the first data existed at a first point in time, and
the least one replication log or data associated therewith includes at least one indication of a second point in time at which the first data is consistent;

utilizing, by the computing device, the least one replication log to cause the at least one change to the second data to be generated;

causing to be created a snapshot of the second data at or near the second point in time;

analyzing the snapshot of the second data changed according to the least one replication log; and accessing the one or more of the individual data objects as the data objects existed at the second point in time.

17. The at least one computer-readable medium of claim 16 wherein the second data includes a database and at least one database log, wherein the least one replication log includes modifications to the database and/or the at least one database log, and wherein utilizing the least one replication log to replicate the changes to the second data includes modifying the database using the at least one database log.

18. The at least one computer-readable medium of claim 16 wherein analyzing the snapshot of the second data includes performing at least one modification to the snapshot of the second data, and the method further comprises:

after analyzing the snapshot of the second data, reverting the snapshot of the second data; and after reverting the snapshot of the second data, utilizing least one replication log to replicate additional changes to the second data.

19. The at least one computer-readable medium of claim 16 wherein the first data includes a database, and wherein the method further comprises creating a first snapshot of both the database and transaction or replication logs associated with the database, playing portions of one or more of the logs to commit corresponding changes to the database, and creating a second snapshot of the first snapshot, wherein a user can analyze data in the database as the database existed as of a time that the logs were played into the database.

20. The at least one computer-readable medium of claim 16, wherein the method further comprises: causing an initial full copy of the first data to be created, thereafter causing a snapshot of the first data to be created, and thereafter, causing incremental copies or snapshots of the first data and the logs to be created.

21. The at least one computer-readable medium of claim 16, wherein the method further comprises performing at least one test of the first snapshot in order to validate or verify the snapshot and ensure that the first data was correctly copied.

* * * * *